Figure 1:
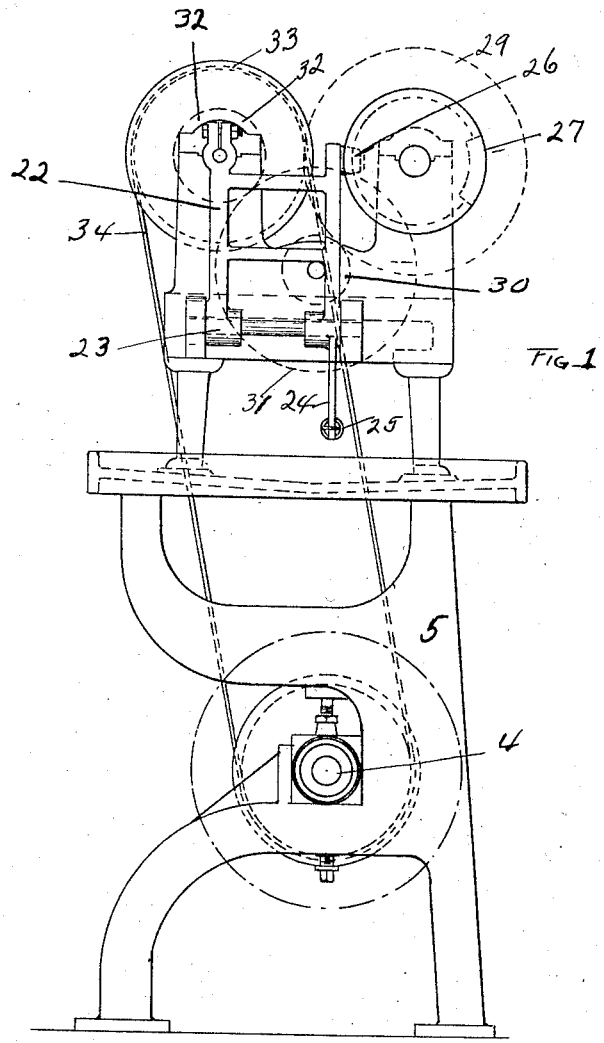

Dec. 1, 1925.

F. W. TRENN 1,563,940

BOLT MACHINE

Filed March 23, 1921 3 Sheets-Sheet 1

Inventor
F. W. Trenn
By Karl Franing
his Attorney

Dec. 1, 1925.
F. W. TRENN
1,563,940
BOLT MACHINE
Filed March 23, 1921    3 Sheets-Sheet 2
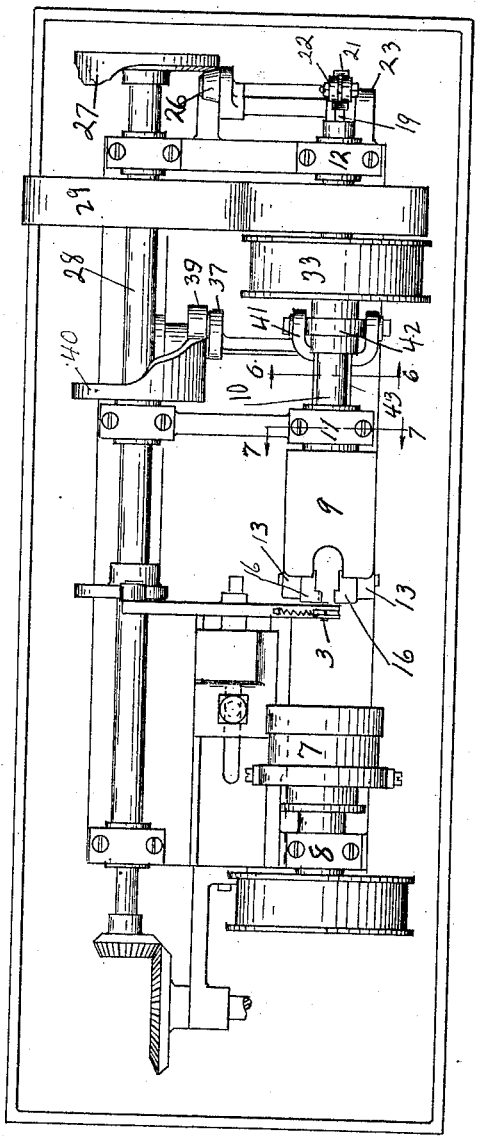
Fig. 2
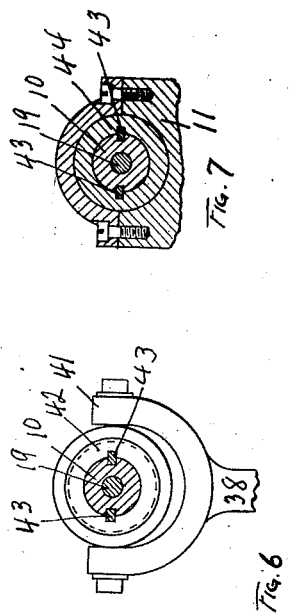
Fig. 7
Fig. 6
Inventor
F. W. Trenn
By Karl Fenning
his Attorney

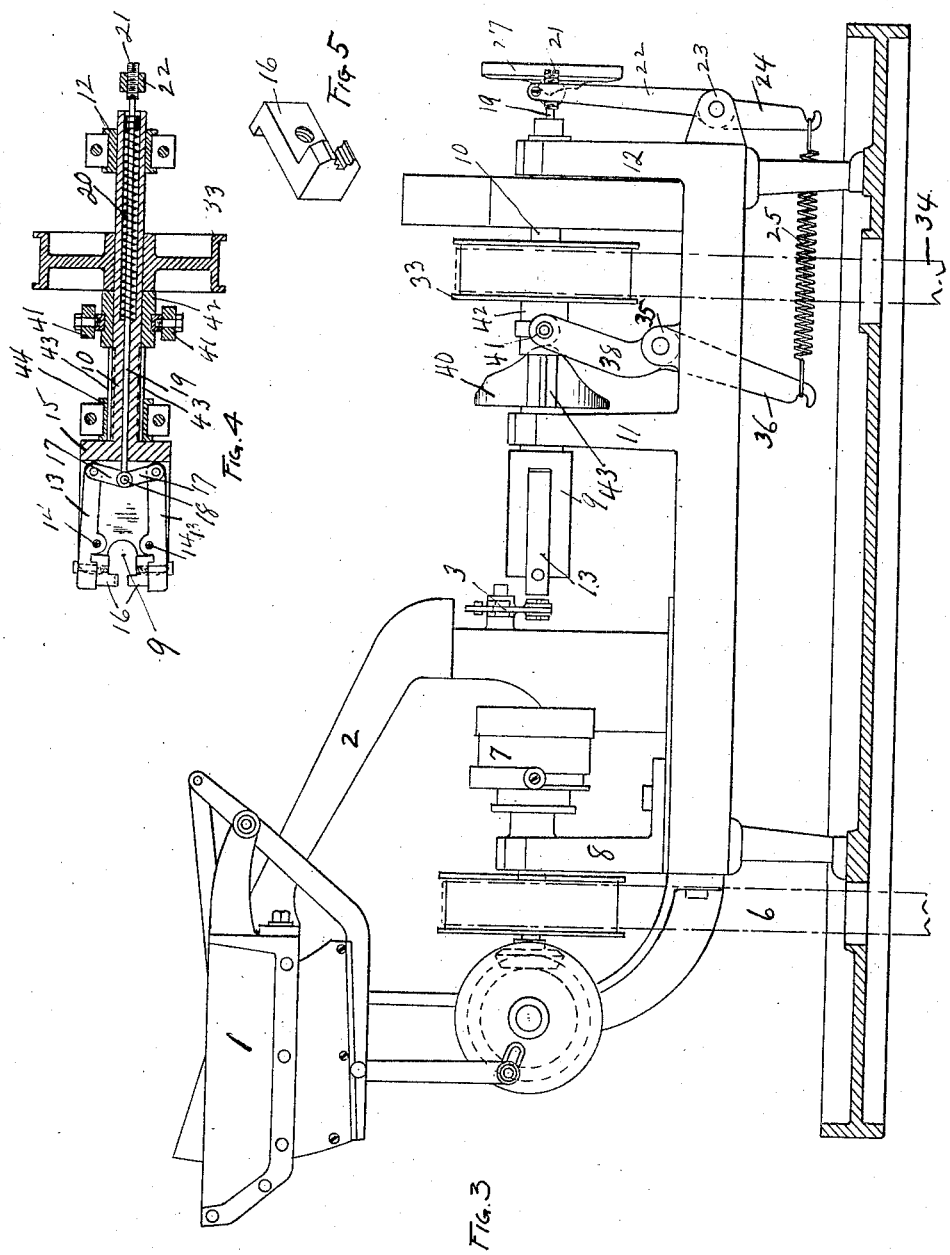

Patented Dec. 1, 1925.

1,563,940

UNITED STATES PATENT OFFICE.

FRANK W. TRENN, OF WILLOUGHBY, OHIO, ASSIGNOR TO THE ECONOMY ENGINEERING COMPANY, A CORPORATION OF OHIO.

BOLT MACHINE.

Application filed March 23, 1921. Serial No. 454,808.

*To all whom it may concern:*

Be it known that I, FRANK W. TRENN, a citizen of the United States, residing at Willoughby, in the State of Ohio, have invented certain new and useful Improvements in Bolt Machines, of which the following is a specification.

My invention relates particularly to means for forming threads on the end of a blank.

To this end it consists of means for placing a blank before a chuck in proper position to be grasped by the chuck which is then advanced toward a rotary cutting head into which the end of the blank projecting from the chuck is inserted. Means may be provided for opening and closing the chuck and the cutting die head.

In the accompanying drawings Figure 1 is an end elevation of one form my machine may take; Fig. 2 is a plan view; Fig. 3 is a side elevation; Fig. 4 is a horizontal transverse section through the chuck; Fig. 5 is a detail perspective view of a part of the chuck; Fig. 6 is a transverse vertical section on the line 6—6 of Fig. 2; and Fig. 7 is a transverse vertical section on the line 7—7 of Fig. 2.

The blanks on which the machine is to operate may be headed and may be put into the usual hopper 1 from which extends a chute 2 from the end of which the blanks are taken by picker fingers 3. Any old, and well known in the art, hopper chute and picker fingers may be used and those here shown need not be further described. Picker finger mechanism such as is shown in the patent to Riley, 1,482,359, could be employed as a transferring mechanism.

A driving shaft 4, mounted in the legs 5 of the machine, by means of a belt 6 rotates a shaft on which is a thread cutting die head 7 of any usual well known type. The die head may be opened and closed by any of the ordinary devices common in the art. The shaft of the die head is shown as mounted on a pillar 8 at one end of the machine under the hopper 1. This shaft has no lateral movement in its bearing nor has the die head itself a lateral movement on the shaft.

In alignment with the die head 7 is a chuck 9 mounted on a hollow shaft 10 resting in two bearings one in a pillar 11 near the center of the machine and the other in a pillar 12 at the end of the machine opposite the pillar 8.

The specific chuck shown consists of a pair of jaws 13 each pivoted on a separate vertical pivot 14 in a forked head piece 15. The forward end of the jaws 13 carry face plates 16 which correspond in size and shape with the blank to be operated on. The face plates 16 are removable and may be changed to correspond to changes in the blank to be operated on. The jaws 13 may be turned on their pivots 14 to cause the face plates 16 to grasp or release a blank. This pivotal movement of the jaws 13 is caused by a pair of toggle arms 17 pivoted to the inwardly extending ends of the jaws 13. The toggle arms 17 are pivoted together at 18 to an operating rod 19 which extends through the hollow chuck shaft 10 and protrudes beyond the supporting pillar 12. Surrounding the rod 19 is a spring 20 resting against a shoulder in a pocket in the chuck shaft 10. The spring 20 tends to hold the face plates 16 together in position to grasp and hold a blank. The chuck 9 and its shaft 10 may be reciprocated, in a manner hereinafter to be explained, through its bearings in the pillars 11 and 12.

When the chuck is at its right hand position in Figs. 2 and 3 the projecting end of the rod 19 is in engagement with a pin 21 carried by a lever 22 pivotally mounted in transverse bearings 23 on the end of the machine. A downwardly extending arm 24 from the lever 22 engages a spring 25, the tendency of which is to hold the pin 21 from pressing upon the rod 19. One arm of the lever 22, however, carries a roller 26 in position to be engaged by a cam 27 to force the pin 19 toward the left in Figs. 2, 3 and 4 and so cause the toggle 17 to open the clamping faces 16 and release the blank. The cam 27 is mounted on a cam shaft 28 which is driven through suitable gearings 29, 30, 31 and 32, see Fig. 1, from the pulley 33 loosely mounted on the shaft 10. The pulley 33 itself is driven from the main shaft 4 through a belt 34.

Mounted in a transverse bearing 35 on the frame between the pillars 11 and 12 is a lever having a downwardly extending arm 36 which engages one end of the spring 25 carried by the tail piece 24 of the lever 22. Integral with the arm 36 are upwardly extending arms 37 and 38. The arm 37 carries a roller 39 in position to be engaged by a cam 40 on the cam shaft 28. The arm 38 has at its upper end a yoke 41 engaging a collar 42 carried by the chuck shaft 10. The collar 42 is fast on the shaft 10 so that the lever 38, as allowed by the cam 40, but under the influence of the spring 25, forces the chuck 9 toward the left of Figs. 2, 3 and 4. The bearing for the chuck shaft 10 on pillar 11, as shown in Fig. 7 is provided with ways 44 which engage the fins 43 on the shaft 10 so that the shaft 10 carrying the chuck 9 may be reciprocated through the bearing on the pillar 11 but will be held against rotation therein.

It will be seen that in operation blanks fed into the hopper 1 will be received by the picker fingers 3 and brought into alignment with the chuck 9 with their headed ends toward the chuck. The cam 40 will allow the chuck to advance and surround the head of the blank at which time the cam 27 will allow the chuck to close and grip the blank. The picker fingers 3 will then be withdrawn from the path of the chuck which will advance and insert the shank of the blank into the rotating cutter head 7. The blank is held from rotation by the plates 16. Threads will thus be cut upon the blank until the cutting head 7 is opened when the chuck will recede and be opened by the engagement of the pin 21 with the rod 19 to allow the threaded blank to fall out and to receive the next succeeding blanks.

One specific embodiment of the invention has been described but the details are not essential. Since many of the elements which go to make up the whole are well known and old in the art, the invention is not limited thereby but substitution of other forms of elements may be made without departing from the present invention.

I claim as my invention:

In a machine of the character described, the combination of a rotatable cutting head, a reciprocable, non-rotatable chuck in alignment therewith, said chuck comprising blank grasping mechanism and a reciprocable hollow shaft, a reciprocable rod in said shaft adapted to operate said blank grasping mechanism, cam means for moving said rod to cause said chuck to grasp a blank, resilient cam controlled means to cause said chuck to move toward and insert the blank in said cutting head, and other cam means in connection with said resilient means for causing said chuck to retreat from said cutting head and to cause said grasping mechanism to release said blank.

FRANK W. TRENN.